Feb. 2, 1943.   T. R. SCOTT ET AL   2,309,992
ELECTRIC POWER CABLE
Filed Nov. 29, 1938

INVENTORS
T. R. Scott
J. K. Webb
BY
ATTORNEY

Patented Feb. 2, 1943

2,309,992

UNITED STATES PATENT OFFICE 2,309,992

ELECTRIC POWER CABLE

Thomas Robertson Scott and John Krauss Webb, London, England, assignors to International Standard Electric Corporation, New York, N. Y.

Application November 29, 1938, Serial No. 242,902
In Great Britain December 24, 1937

3 Claims. (Cl. 174—25)

This invention relates to electric power cables and more particularly to cables the insulation of which contains free compound to fill up any voids that may be present. Such cables include mass impregnated cables, in which the amount of compound in the cable remains unchanged during operation thereof; and oil filled cables, in which the amount of compound in the cable changes from time to time, reservoirs of compound in communication with ducts within the cable being provided to maintain sufficient compound within the insulation. Both kinds of cable, however, contain fibrous insulation which is impregnated with the cable compound which is generally oil or a mixture of oil and other ingredients and the generic term "compound" is hereinafter employed to refer to the impregnant such as oil.

The amount of compound within a cable depends upon various factors, such as whether a solid or stranded conductor is employed, upon the amount of free space between adjacent lappings of fibrous material, and upon the absorption characteristics of the fibrous material. From time to time various proposals have been put forward for reducing the volume of cable compound required within a cable. It has, for example, been proposed to make the conductor solid instead of stranded in order to eliminate the compound content of the strand which amounts to approximately 25% of the strand volume in many cases. Proposals have also been put forward for lead sheathing the conductor for the same purpose. An object of this invention is to reduce the amount of cable compound required in order to mitigate difficulties due to expansion and migration of compound and in order to effect this desired result the content of the cable compound contained within the body of the insulation is reduced.

Figure 3:
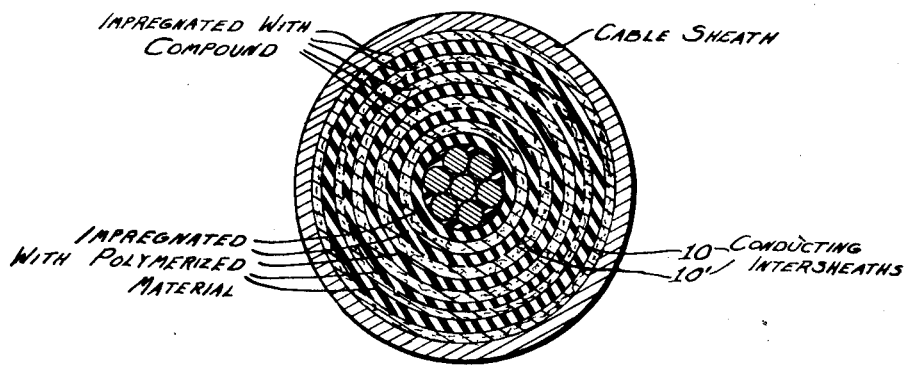
Figure 1:
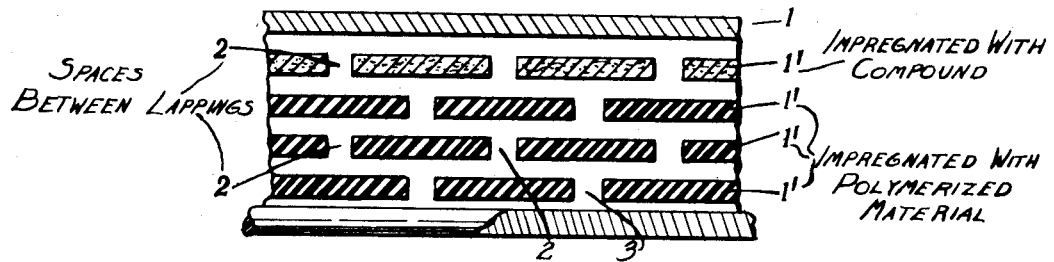
Figure 2:
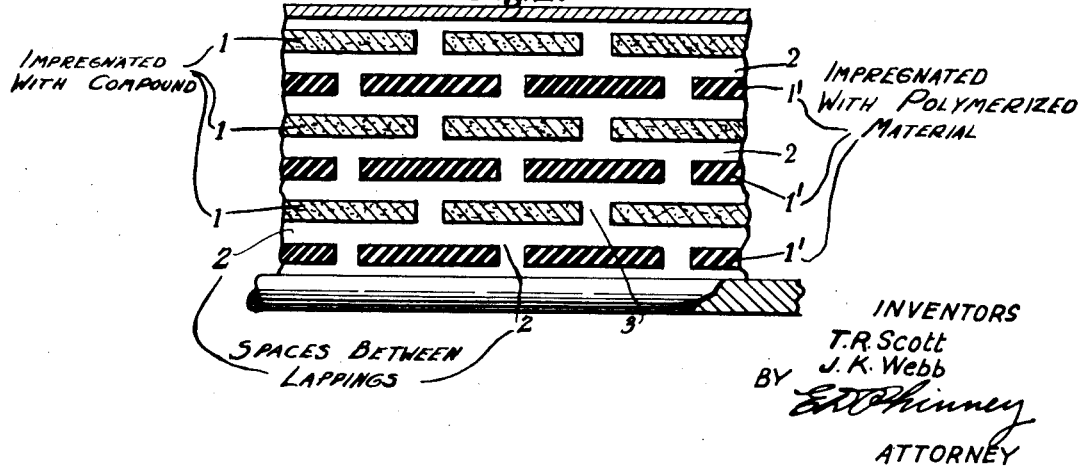

The nature of the invention will be better understood from the following description taken in conjunction with the accompanying drawing in which Figs. 1 and 2 show fragmentary longitudinal cable sections illustrating in exaggerated scale the tape arrangement; and Fig. 3 is a cross-sectional view showing a cable according to the invention and provided with conducting intersheaths.

In cable construction, insulation may be used which comprises lappings of fibrous material. The whole insulation is thoroughly permeated by cable compound which fills the spaces between the lappings, but in addition the fibrous material is thoroughly impregnated in or soaked with the compound and in fact in many cases as much as 60% of the cable compound is contained within the fibrous insulation. It has been proposed to provide fibrous insulation of equal or improved electrical characteristics which will not absorb the cable compound or will only absorb it to a small extent. In this connection fibrous material which has been treated to prevent or minimize very greatly the absorption of compound may be used. It will be appreciated that such insulation contains up to about 60% less compound than that contained by the untreated insulation.

In order to achieve this result the fibrous insulating material for a cable is impregnated with polymerised material whereby an insulating material is provided having very satisfactory electrical properties, and furthermore which does not absorb the compound to any appreciable extent.

As will be understood from the above, the fibrous material impregnated with polymerised material is preferably applied in the form of lappings of tape, paper or the like, for example fibrous tape treated in accordance with the technique specified in our U. S. Patent No. 2,147,824.

In an alternative arrangement the tape paper or the like may be surface impregnated or lacquered with polymerised material in which case care should be taken that the edges of the tape paper or the like are lacquered so that cable compound does not permeate the interior of the tape paper or the like and the unimpregnated interior should be of such reduced proportions that ionisation does not take place in service. In cases in which lacquered tapes are employed polymers which do not have liquid monomers e. g. polyethylene may be used. The interior space within the lacquered tapes may be impregnated with a high melting point compound such as halowax which would be dissolved by the cable compound if it were exposed but which is satisfactory in the case under consideration in view of the lacquer of polymer. It will be understood therefore that the term impregnated with the polymerised material includes both surface impregnation and complete impregnation.

Preferably the polymer employed is polystyrene, which may be suitably plasticised, for example as set forth in co-pending U. S. application of G. J. Warner and A. A. New, Serial No. 190,032 filed Feb. 11, 1938, which matured to Patent No. 2,272,996 dated February 10, 1942, or may be blended with other polymers as desired. Considering this question generally, the polymer employed as the impregnant in the fibrous material should have insulating properties such that it is suitable for use in the insulation of a power cable; it should be solid or at all events should not run at the maximum working temperature of the cable, and should further not enter into any detrimental reaction with the cable compound.

The polymer must not for example, be soluble in the cable compound as it may then be dissolved out of the fibrous insulation by the cable compound.

It will be appreciated from the above that the employment of a fibrous material such as paper impregnated with polymer reduces considerably the volume of compound required in a cable, and also reduces correspondingly the expansion effects, migration effects, and so on.

In this connection we had previously propounded the theory that in normal mass impregnated power cables each paper tape has to re-impregnate itself during cooling due to the fact that it has exuded compound during heating. It is believed that this effect is entirely overcome in a cable in which the insulation is built up in accordance with the present invention. This is very advantageous in that during the process of reimpregnation referred to the insulation is electrically weaker than at other times.

In building up the insulation the lappings of fibrous material impregnated with polymer may be applied in the normal manner after which the cable should be kept reasonably cool until the compound has been added since any excessive heating of the cable would tend to render the polymer in the fibrous insulation soft and sticky with the result that adjacent layers would adhere, after which bending of the cable would become impracticable. Nevertheless the cable may be subjected to normal heating such as that experienced in the process of lead sheathing cables or in vacuum drying treatment designed to remove moisture. In view of the above the fibrous impregnated insulation should be applied in a dry condition and so maintained until the compound has been added which may be carried out by the process described in our U. S. Patent No. 2,063,346. The application of compound to the cable is, of course, simplified inasmuch as a reduced volume thereof is required.

It may be mentioned that in this specification a distinction is to be noted between the use of the word "permeated" and the word "impregnated," "impregnated" being employed to denote that the material e. g. polymer, enters the fibrous material, while "permeated" is employed to denote that the material, e. g. compound is contained only in the spaces between the fibrous material.

There are two difficulties which should be guarded against in the preparation of a cable, namely:

(a) Migration of compound towards the outer circumference of the sheath may cause distention of the sheath with the consequence that a space may be left between the sheath and the insulation, particularly when the cable cools. It may be added that this difficulty is in no way confined to cables in accordance with the present invention.

(b) The heat applied to the insulation during stoppages occurring during the application of the lead sheath which generally speaking is applied by extrusion, may melt the polymer on the outer layers with the result that adherence of the outer layers of insulation takes place.

In order to overcome these difficulties it may be desirable to impregnate the outer layers of the insulation of fibrous material not with polymer, but with compound, e. g. oil, so that the outer layers of the insulation are built up from normal impregnated tapes.

The present invention therefore provides an electric power cable comprising one or more than one conductor insulated by fibrous material and cable compound characterised in this that the fibrous insulation adjacent to the conductor or each of the conductors is impregnated with polymerised material and that a belt of fibrous insulation impregnated with cable compound is provided between the insulation impregnated with polymerised material and the cable sheath.

This is shown in Fig. 1 in which the outer layer 1 consists of fibrous material which is impregnated with compound in the known way, whilst the inner layers 1' are impregnated with polymerised material such as polystyrene. The spaces 2 are filled with compound so that this compound permeates the whole of the insulating material but does not impregnate the inner layers 1'.

In order to further guard against the trouble mentioned in clause b above the outer layers may form a capillary reservoir. In addition capillary reservoirs as described in U. S. Patent No. 1,958,281 may be provided to guard against migration of compound along the stranded conductor. These capillary reservoirs referred to above comprise fibrous material which may or may not be impregnated with polymer and which preferably have absorption properties of a much lower order than the absorption properties of the main body of the insulation.

In order to provide capillary action or for reasons of economy the fibrous wrappings impregnated with polymer may be interleaved with fibrous wrappings impregnated with compound, e. g. oil, which may be applied unimpregnated and impregnated after application of the sheath as described above. The invention therefore includes a power cable the insulation of which comprises lappings of fibrous material impregnated with polymerised material, interleaved with lappings of fibrous material impregnated with cable compound, the whole being permeated by cable compound.

This embodiment of the invention is illustrated diagrammatically in Fig. 2 in which 1' represents fibrous material impregnated with polymerised material and 1 indicates fibrous material impregnated with cable compound. In Fig. 2 the fibrous material impregnated with polymeric material is interleaved alternately with fibrous material impregnated with compound. With this arrangement the cable insulation is free from "stickiness" at the higher temperatures and the cable can be removed from service in one place and installed at another place as desired. The cable of Fig. 2 is rather cheaper than one using only polymer impregnated tape and is electrically stronger than one using only compound impregnated tape. On the other hand if desired, several layers of fibrous material impregnated with polymerised material may be interleaved with several layers of fibrous material impregnated with cable compound.

A cable constructed or built up in accordance with the present invention may if necessary be provided with conducting intersheaths 10, 10' arranged in the insulation as shown in Fig. 3 for example as described in co-pending U. S. application of T. R. Scott and R. C. Mildner, Serial No. 75,710 filed April 22, 1936, now U. S. Patent 2,191,995, issued February 27, 1940, in which the intersheaths are arranged and connected in such a way that a number of capacities in parallel is included in the main body of the insulation external to the conductor to introduce additional capacity between the conductor and the intersheaths between one or more intersheath systems so that the distribution of electrical stress between the main conductor and the cable sheath is effectively graded.

A method of manufacturing cables in accordance with the invention has been referred to above and the invention therefore includes as a further feature a method of insulating an electric power cable comprising applying a fibrous base impregnated with polymerised material to the cable core or cores and maintaining the applied insulation in a cool condition until the cable compound such as oil has been applied to the cable insulation.

What is claimed is:

1. An electric power cable comprising at least one conductor, a sheath and fibrous insulating material between said sheath and said conductor, a portion of said insulation material being impregnated with cable compound and at least half of said insulating material being impregnated with a non-migratory insulating material which is insoluble in said cable compound, whereby the amount of cable compound required to fill said cable is reduced and migration of said cable compound is restricted, said insulating material comprising lappings of fibrous material impregnated with polymerized material interleaved with lappings of fibrous material impregnated with cable compound, the whole being permeated by cable compound.

2. An electric power cable comprising at least one conductor, a sheath and insulating material between said conductor and said sheath, said insulating material consisting primarily of fibrous material impregnated with polymerized material and permeated with cable compound, said fibrous material being separated from said sheath by a layer of insulating material impregnated with cable compound and at least a portion of said polymer impregnated material being adjacent said conductor, whereby the amount of cable compound required to fill said cable is reduced and sticking of said polymer impregnated material is avoided.

3. An electric power cable according to claim 2 wherein said polymerized material is polystyrene.

THOMAS ROBERTSON SCOTT.
JOHN KRAUSS WEBB.